United States Patent
Pfau et al.

(10) Patent No.: US 7,904,210 B2
(45) Date of Patent: Mar. 8, 2011

(54) VIBRATION CONTROL SYSTEM

(75) Inventors: Douglas Allen Pfau, Canton, MI (US); David Michael Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 401 days.

(21) Appl. No.: 12/050,494

(22) Filed: Mar. 18, 2008

(65) Prior Publication Data

US 2009/0240375 A1 Sep. 24, 2009

(51) Int. Cl.
*G06F 19/00* (2011.01)

(52) U.S. Cl. .......................... 700/280; 700/275

(58) Field of Classification Search .............. 700/280, 700/275; 701/53, 111; 702/56, 183; 318/71.14, 318/128; 82/137, 158, 163, 118
See application file for complete search history.

(56) References Cited

U.S. PATENT DOCUMENTS

| | | | |
|---|---|---|---|
| 3,826,870 A | 7/1974 | Wurm et al. | |
| 4,245,254 A * | 1/1981 | Svensson et al. | 348/208.4 |
| 4,689,514 A * | 8/1987 | Kondoh et al. | 310/323.21 |
| 5,135,079 A | 8/1992 | Shimazaki | |
| 5,136,998 A * | 8/1992 | Deutsch | 123/406.4 |
| 5,170,103 A * | 12/1992 | Rouch et al. | 318/128 |
| 5,272,286 A | 12/1993 | Cain et al. | |
| 5,313,407 A * | 5/1994 | Tiernan et al. | 700/280 |
| 5,371,802 A | 12/1994 | McDonald et al. | |
| 5,469,510 A | 11/1995 | Blind et al. | |
| 5,485,523 A | 1/1996 | Tamamura et al. | |
| 5,627,747 A * | 5/1997 | Melton et al. | 700/83 |
| 5,649,018 A | 7/1997 | Gifford et al. | |
| 5,809,843 A | 9/1998 | Barger et al. | |
| 6,443,273 B1 * | 9/2002 | Ledbetter et al. | 188/379 |
| 6,865,466 B2 | 3/2005 | Voight et al. | |
| 7,567,013 B2 * | 7/2009 | Lu et al. | 310/319 |
| 7,715,949 B2 * | 5/2010 | Sato et al. | 700/280 |
| 7,727,050 B2 * | 6/2010 | Sanuki et al. | 451/11 |
| 2002/0039422 A1 | 4/2002 | Daly | |
| 2006/0056642 A1 | 3/2006 | Inoue et al. | |

* cited by examiner

*Primary Examiner* — Kidest Bahta
(74) *Attorney, Agent, or Firm* — Fraser Clemens Martin & Miller LLC; J. Douglas Miller

(57) ABSTRACT

A vibration control system and a method for controlling vibration in a material surface are disclosed, wherein the vibration control system provides a desired motion of the material surface while militating against any undesirable motion of the surface. The vibration control system includes a sensor disposed adjacent a material surface having a first set of dynamic vibration properties, a displacement generating device disposed adjacent the material surface adapted to generate a localized motion in the material surface, and a controller adapted to receive an input signal from the sensor and transmit a control signal to the displacement generating device thereby controlling the localized motion in the material surface.

16 Claims, 2 Drawing Sheets

VIBRATION CONTROL SYSTEM

FIELD OF THE INVENTION

The present invention relates to vibration dampeners. More particularly, the invention is directed to a vibration control system and a method for controlling vibration in a material surface.

BACKGROUND OF THE INVENTION

When a surface is subjected to a vibration input (e.g. tactile feedback or haptic effect) in an automotive environment, there is no current active control algorithm to generate a localized standing wave to dampen out areas that were not intended to vibrate. The problem is currently solved by increasing the damping around the area of interest or creating a physical separation. One skilled in the art would understand that a vibration input can be used in human-machine-interfaces (i.e. generally referred to as haptic technology). Haptic technology refers to technology which interfaces the user via the sense of touch by applying forces, vibrations, and/or motions to the user. This mechanical stimulation may be used to supply a tactile feedback to the user of a vehicle or other machine to indicate the operational status or condition of the vehicle or machine. Known tactile interface devices are typically constructed as integrated devices, where haptic-enabling components (e.g., actuators and associated control circuits) are integrated with other functional components to form a single structure for a given device. Currently, separate haptic-enabling components are used to generate a desired motion of a surface of interest, thereby creating a tactile feedback (i.e. a tactile sensation) on the surface of interest. Typically, the integrated haptic-enabling components increase the complexity, size, and cost of the tactile interface device and further limit the application of the tactile interface device.

It would be desirable to develop a vibration control system and a method for controlling vibration in a material surface, wherein the vibration control system militates against an undesirable motion of a localized portion of the material surface.

SUMMARY OF THE INVENTION

Concordant and consistent with the present invention, a vibration control system and a method for controlling vibration in a material surface, wherein the vibration control system militates against an undesirable motion of a localized portion of the material surface, have surprisingly been discovered.

In one embodiment, a vibration control system comprises a sensor disposed adjacent a material surface having a first set of dynamic vibration properties, a displacement generating device disposed adjacent the material surface adapted to generate a localized motion in the material surface, and a controller adapted to receive an input signal from the sensor and transmit a control signal to the displacement generating device thereby controlling the localized motion in the material surface.

In another embodiment, a vibration control system comprises a sensor disposed adjacent a material surface having a first set of dynamic vibration properties, a displacement generating device disposed adjacent the material surface adapted to generate a desired motion in the material surface, and a controller including a processor and a programmable component, the controller adapted to receive an input signal from the sensor and transmit a control signal to the displacement generating device thereby controlling the desired motion in the material surface.

The invention also provides methods for controlling vibration in a material surface.

One method comprises the steps of: providing a sensor disposed adjacent a material surface having a first set of dynamic vibration properties; providing a displacement generating device disposed adjacent the material surface adapted to generate a localized motion in the material surface; providing a controller adapted to receive an input signal from the sensor, analyze the input signal, and transmit a control signal to the displacement generating device; measuring a motion of the material surface, transmitting an input signal to the controller, wherein the input signal represents the motion of the material surface; analyzing the input signal, transmitting a control signal to the displacement generating device; and generating a desirable motion in the material surface.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
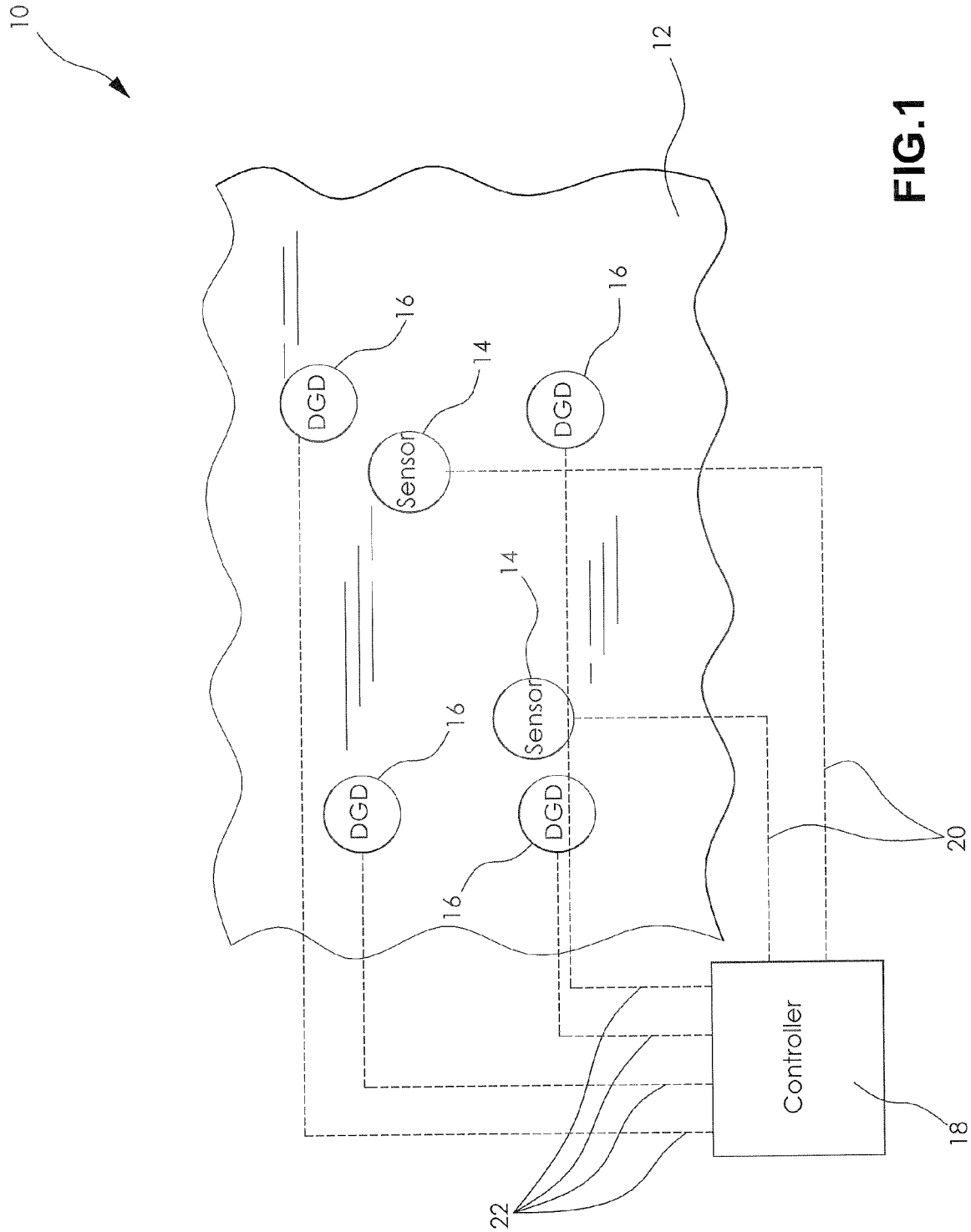
FIG. 1 is a schematic diagram of a vibration control system in cooperation with a material surface according to an embodiment of the present invention.

FIG. 1 shows a vibration control system 10 disposed adjacent a material surface 12 according to an embodiment of the present invention. The material surface 12 may be formed from any material having a first set of dynamic vibration properties. The first set of dynamic vibrations properties are defined as a plurality of material properties of the surface that affect a reaction of the material surface 12 to a vibration input (not shown). As a non-limiting example, the material properties that affect the reaction of the material surface 12 to a vibration input may be a size, a shape, a thickness, and a type of material. It is understood that other material properties may affect the reaction of the material surface 12 to a vibration input. The first set of dynamic vibration properties are pre-determined in order to calibrate the vibration control system 10. The first set of dynamic properties of the surface material 12 may be known in the art. The first set of dynamic vibration properties may also be pre-determined by experimentation such as trial and error, for example.

The vibration control system 10 includes a plurality of sensors 14, a plurality of displacement generating devices (DGD) 16, and a controller 18. The sensors 14 are disposed adjacent the material surface 12 and in electrical communication with the controller 18. The sensors 14 are adapted to measure a displacement of the material surface 12. The sensors 14 are further adapted to transmit an input signal 20 to the controller 18, the input signal 20 representing the real-time displacement of the material surface 12. Although two sensors 14 are shown disposed adjacent the material surface 12, it is understood that any number of sensors 14 may be used, as desired.

The displacement generating devices 16 are disposed adjacent the material surface 12 and in electrical communication with the controller 18. The displacement generating devices 16 are adapted to generate a desired motion in the material surface 12. As a non-limiting example, the displacement generating devices 16 may be adapted to generate a localized standing wave in the material surface 12 to dampen an undesirable motion in the material surface 12. The displacement generating devices 16 are further adapted to receive a control signal 22 from the controller 18. Although four displacement generating devices 16 are shown, it is understood that any number of displacement generating devices 16 may used, as desired.

The controller 18 is in electrical communication with the sensors 14 and the displacement generating devices 16. The controller 18 is adapted to receive the input signal 20 from the sensors 14. The controller 18 is further adapted to analyze the input signal 20 and transmit the control signal 22 to the displacement generating devices 16 for controlling an operation of each of the displacement generating devices 16. The controller 18 may be any device adapted to receive the input signal 20, process the input signal 20, and transmit the control signal 22 such as a microcomputer, for example.

Figure 2:
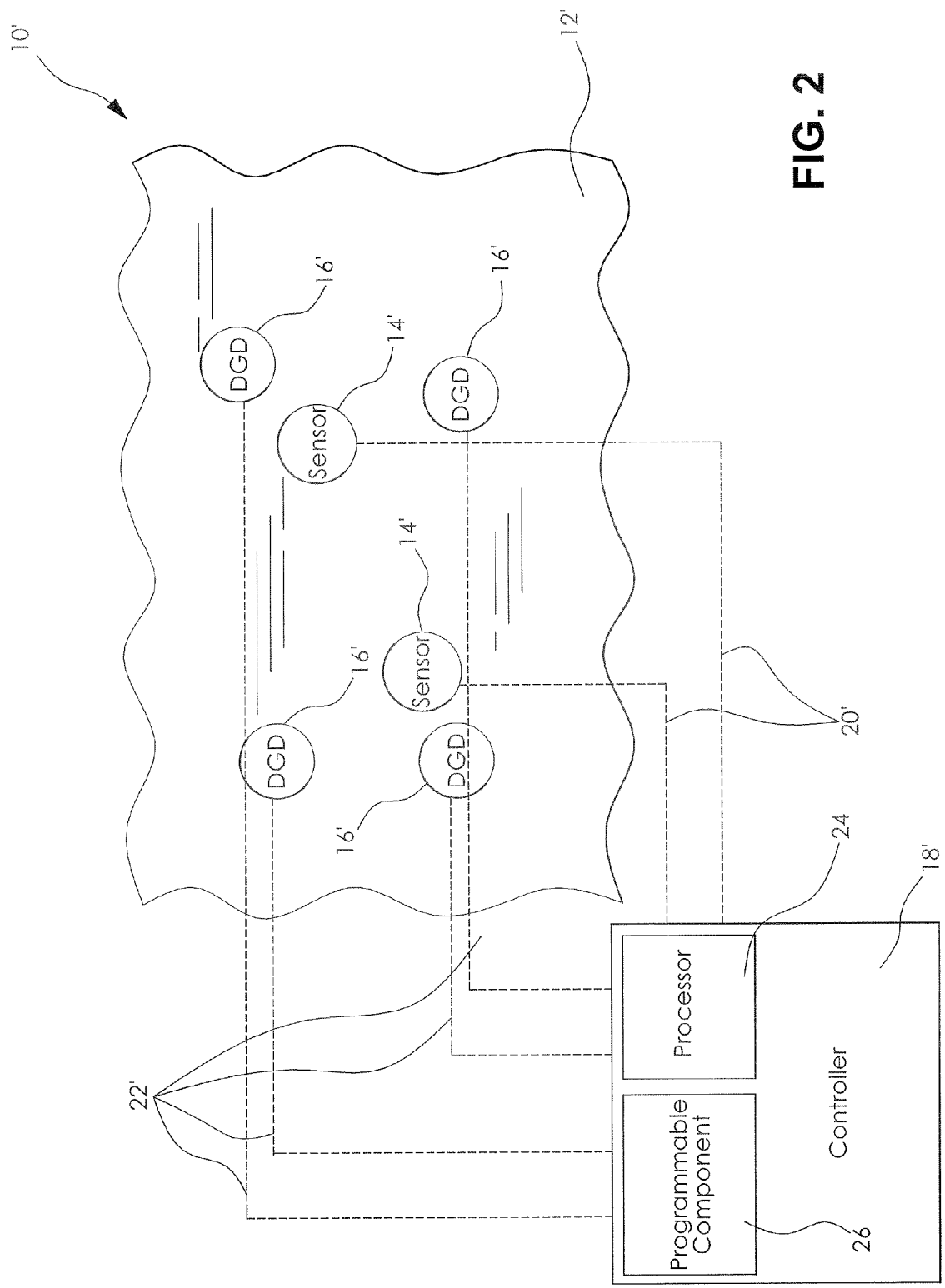
FIG. 2 is a schematic diagram of a vibration control system in cooperation with a material surface according to another embodiment of the present invention.

In another embodiment shown in FIG. 2, the controller 18' includes a processor 24 and a programmable component 26. Structure repeated from the description of FIG. 1 includes the same reference numeral and a prime (') symbol. It is understood that the controller 18' may include other components such as a memory device, for example. The processor 24 of the controller 18' is adapted to analyze the input signal 20' received from the sensors 14'. The processor 24 is further adapted to generate and transmit the control signal 22' to the displacement generating devices 16' based upon the analyses of the input signal 20'. It is understood that the processor 24 may be adapted to perform other processing functions such as analyzing a feedback transmitted from the displacement generating devices 16' and transmitting a control function to the sensors 14', for example. The programmable component 26 is adapted to manage and control processing functions of the processor 24. Specifically, the programmable component 26 is adapted to control the analysis of the input signal 20 and the generation and transmission of the control signal 22'. The programmable component 26 provides a means for a user to actively manage the operation of each of the displacement generating devices 16' and thereby control the motion of the material surface 12'.

In use, the material surface 12, 12' is exposed to an input vibration (e.g. tactile feedback or haptic effect). The sensors 14, 14' of the vibration control system 10, 10' measure the real-time displacement of the material surface 12, 12' and transmit the input signal 20, 20' to the controller 18, 18'. The controller 18, 18' receives the input signal 20, 20' and performs a pre-programmed analysis on the input signal 20, 20'. The controller 18, 18' then generates the control signal 22, 22' and transmits the control signal 22, 22' to the displacement generating devices 16, 16'. The displacement generating devices 16, 16' receive the control signal 22, 22' and operate in response to the control signal 22, 22' to provide motion in the material surface 12, 12'. As a non-limiting example, the displacement generating devices 16, 16' may generate a responsive vibration that is out of phase with an undesired vibration to cancel an undesirable motion of the material surface 12, 12'. The vibration control system 10, 10' may be calibrated to provide a desired localized displacement (e.g. tactile feedback) in the material surface 12, 12' while not disturbing areas outside of the localized region.

The vibration control system 10, 10' and the method for controlling vibration in the material surface 12, 12' provide the desired motion in a localized portion of the material surface while militating against any undesirable motion of the material surface. The vibration control system 10, 10' reduces the need for secondary damping devices and provides increased design flexibility.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A vibration control system comprising:
a sensor disposed adjacent a material surface having a first set of dynamic vibration properties for generating an input signal representing a displacement of the material surface;
a plurality of displacement generating devices disposed adjacent the material surface generating a localized tactile feedback in a first portion of the material surface and minimizing a displacement in a second portion of the material surface; and
a controller adapted to receive the input signal from the sensor and in response to an analysis of the input signal, transmit a control signal to at least one of the displacement generating devices to control the displacement of the material surface.

2. The vibration control system according to claim 1, wherein the sensor measures a real-time displacement of the material surface.

3. The vibration control system according to claim 1, wherein at least one of the displacement generating devices generates a cancellation motion in the material surface to militate against undesired motion in the second portion of the material surface.

4. The vibration control system according to claim 1, wherein the controller includes a processor for receiving the input signal and generating the control signal and a programmable component for controlling the processor.

5. The vibration control system according to claim 4, wherein the programmable component is adapted to manage and control processing functions of the processor.

6. The vibration control system according to claim 5, wherein the programmable component is pre-programmed to generate the control signal in response to the input signal.

7. A vibration control system comprising:
a sensor disposed adjacent a material surface having a first set of dynamic vibration properties for generating an input signal representing a displacement of the material surface;
a first displacement generating device disposed adjacent the material surface generating a localized tactile feedback in a first portion of the material surface;
a second displacement device disposed adjacent the material surface minimizing a displacement in a second portion of the material surface caused by the tactile feedback generated by the first displacement device; and
a controller including a processor and a programmable component, the controller adapted to receive the input signal from the sensor and in response to an analysis of the input signal, transmit a control signal to each of the displacement generating devices to control an overall motion in the material surface.

8. The vibration control system according to claim 7, wherein the sensor measures a real-time displacement of the material surface.

9. The vibration control system according to claim 7, wherein the second displacement generating device generates a cancellation motion in the material surface to militate against undesired motion in the second portion of the material surface.

10. The vibration control system according to claim 7, wherein the second displacement generating device generates a localized cancellation motion in the material surface to militate against undesired motion in the second portion of the material surface.

11. The vibration control system according to claim 7, wherein the programmable component is adapted to manage and control processing functions of the processor.

12. The vibration control system according to claim 11, wherein the programmable component is pre-programmed to generate the control signal in response to the input signal.

13. A method for controlling vibration in a material surface, the method comprising the steps of:

providing a sensor disposed adjacent a material surface having a first set of dynamic vibration properties, wherein the sensor generates an input signal representing a motion of the material surface;

providing a first displacement generating device disposed adjacent the material surface generating a localized tactile feedback in a first portion of the material surface;

providing a second displacement generating device disposed adjacent the material surface generating a localized displacement in a second portion of the material surface;

providing a controller to receive an input signal from the sensor, analyze the input signal, and transmit a control signal to each of the displacement generating devices; and generating a desirable motion in the material surface, wherein the first displacement generating device generates the tactile feedback in the first portion of the material surface, while the second displacement generating devices minimizes a motion in the second portion of the material surface caused by the tactile feedback generated by the first displacement generating device.

14. The method according to claim 13, wherein the sensor measures a real-time displacement of the material surface.

15. The method according to claim 13, wherein the second displacement generating device generates a cancellation motion in the material surface to militate against undesired motion in the second portion of the material surface.

16. The method according to claim 13, wherein the second displacement generating device generates a localized cancellation motion in the material surface to militate against undesired motion in the second portion the material surface.

* * * * *